March 16, 1965  G. F. LOVELESS  3,173,300
RECIPROCATING MOTION GENERATOR

Filed Oct. 11, 1962  3 Sheets-Sheet 1

INVENTOR
Gerald F. Loveless

BY Richard A. Hayes

ATTORNEY

March 16, 1965 G. F. LOVELESS 3,173,300
RECIPROCATING MOTION GENERATOR
Filed Oct. 11, 1962 3 Sheets-Sheet 2

INVENTOR
Gerald F. Loveless
BY Richmond A. Hayes
ATTORNEY

March 16, 1965 G. F. LOVELESS 3,173,300
RECIPROCATING MOTION GENERATOR
Filed Oct. 11, 1962 3 Sheets-Sheet 3

INVENTOR
Gerald F. Loveless
BY Richmond A. Hayes
ATTORNEY

United States Patent Office 3,173,300
Patented Mar. 16, 1965

3,173,300
RECIPROCATING MOTION GENERATOR
Gerald F. Loveless, 35 Mill St., Stockton, N.Y.
Filed Oct. 11, 1962, Ser. No. 229,940
7 Claims. (Cl. 74—61)

This invention relates to improvements in a device for producing a reciprocating vibratory motion; the device, when associated with one or another industrial unit, being capable of effecting the grading, separating, or sorting of various dry aggregate and other bulk materials. The invention finds full applicability to all manner of shaking or sifting machines, as well as to machines used in the conveying of bulk material from one place to another. Additionally, the invention, singly or in multiple arrangement, enables the combining of conveying with the sorting or separating of bulk material.

Although devices for the general purpose of applicant's invention are currently available, it is believed that their general bulkiness, multiplicity of parts, and lack of accurate adjustment of periodic vibration, render them unsatisfactory, not only from the standpoint of performance, but cost as well.

The present invention has for one of its principal objects the provision of a reciprocating motion generator that is applicable to all manner of machines or mechanisms capable of grading, sorting, and sifting dry aggregate and other bulk material.

Another object of the present invention lies in the provision of a device that may be associated in a manner to selectively and/or intermittently convey bulk material from one place to another and, at the same time, sort or grade such material during conveying.

Another important object of the invention lies in the provision of a device that, due to its component parts and their arrangement, is capable of functioning under circumstances where devices, possibly from lack of power, size, or difficulty of attachment, would not be satisfactory.

A further object of the invention lies in the provision of a device in which all operative parts function about a common axis, thus confining reciprocation in its entirety to the motion and direction desired.

A further important object of the invention consists in producing a device that comprises a minimum number of compact balanced parts which are so integrated as to form a completely enclosed dirt-proof unit.

A still further object of the invention lies in the provision of a device that is compact, economical to manufacture, and readily adjustable and adaptable to many machines or mechanisms wherein vibratory or reciprocating motion is required.

Other objects and advantages of the invention will be more fully understood from a consideration of the following specification, taken in conjunction with the accompanying drawings; and in which FIG. 1 is a perspective view of one form of a bulk handling device to which the present invention has been applied;

FIGS. 7 and 8 are side elevational views of the keeper plate, showing the relationship of the weights in two different positions.

Figure 1:
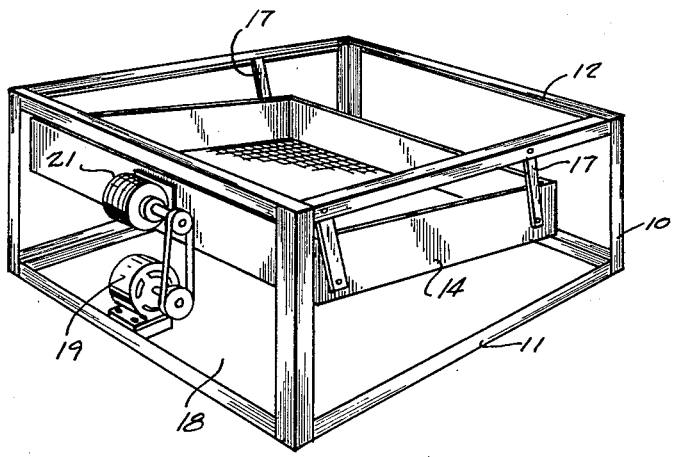

Referring more particularly to the drawings, the reference numeral 10 is employed to generally designate one form of a machine intended to filter, sift, sort, or grade dry aggregate or other bulk material when the present invention is applied thereto. It will be understood that the machine 10 is purely illustrative of one type for use in handling aggregate material and that the present invention is applicable not only to other machines of this general nature, but to other conveyances used to transport such material from one place to another, and in combination with a machine of the type suggested in the drawings. Briefly, the machine 10 includes two rectangular frames 11 and 12, connected by corner uprights 13. A box 14, having a screen bottom 16, is suspended from the top frame 12 by links 17 in such manner as to incline the box and permit swinging movement of it in the direction of its incline. A suitable base or platform 18, joined to the frame 11, provides a mounting place for a motor 19 shown to be located adjacent the head or upper end of the inclined box 14.

Attention is now directed primarily to the device embodying the invention. This device, generally indicated at 21, consists of an enclosed unit wherein balanced but opposed weights are disposed on a common axis and caused to rotate in opposite directions through a suitable drive source, such as the motor 19.

Figure 4:
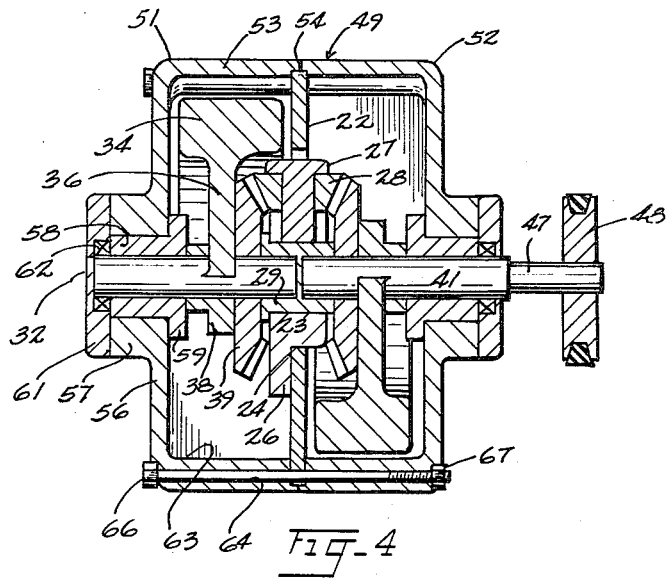
FIG. 4 is an enlarged vertical sectional view, taken substantially on the line 4—4 of FIG. 3.
Figure 5:
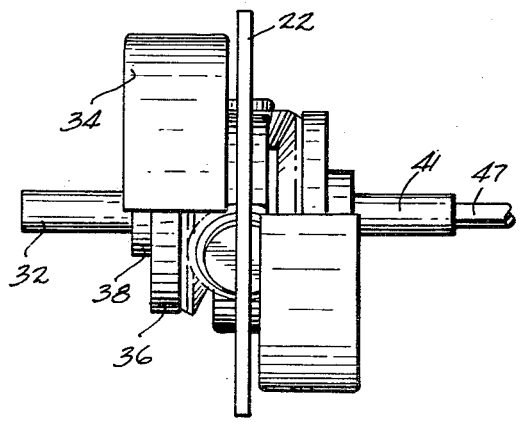
FIG. 5 is an elevational view of the operative parts of the device in assembled relationship, the enclosing covers having been removed.
Figure 7:
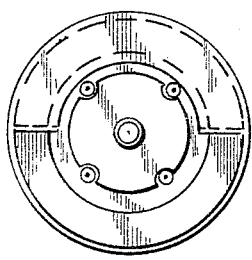
Figure 6:
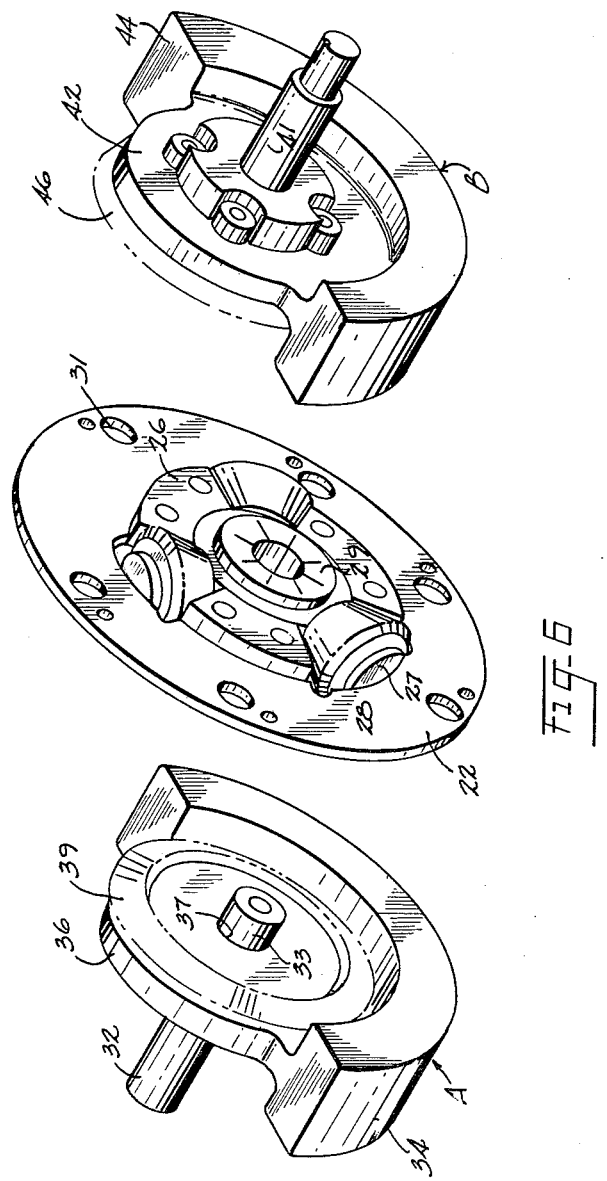
FIG. 6 is an exploded perspective view of the operative parts shown in FIG. 5.

More specifically, and with particular attention directed to FIGS. 4, 5, and 6, the device consists of a keeper plate 22 which carries a bevel gear arrangement that includes a ring-like member 23 fitted into the centered opening 24 of the plate. The member 23, in the present disclosure, includes three, equally spaced, radial lugs 26 which are secured to one face of the plate 22, as indicated in FIG. 6. The body portion of this member is of sufficient proportions to mount pins 27 in the spaces between the lugs 26. The pins in turn mount freely rotatable bevel gears 28 in the relationship shown in FIGS. 5 and 6. Keeping in mind that the member 23 is ring-like, the centered opening therein receives a sleeve bearing 29. A suitable series of transverse openings 31 are uniformly spaced adjacent the periphery of the plate 22.

Reference is now particularly had to one of the operative portions of the unit, indicated at "A" in FIG. 6. A shaft 32, at its inner end 33, projects into the sleeve bearing 29 substantially to the extent shown in FIG. 4. A semi-circular weight 34 includes an inwardly extending web 36 through which an opening 37 is provided, which is of a size to receive shaft 32. This opening represents the center about which the periphery of the weight 34 is created. The web 36, about the opening 37, is reinforced by a collar portion 38 that extends axially away from one web face. Attached to the opposite face of the web is a relatively large bevel gear 39. This gear, of course, has an opening through which the shaft 32 projects. When the combined web and gear are mounted on shaft 32, one or more set screws, carried by the portion 38 and engaged with the shaft 32, prevent relative rotation of these parts.

Again referring to FIG. 6, another portion of the unit is indicated at "B." Herein, a shaft 41, through a web 42 and collar portion 43, mounts a further web 44 on this shaft. This portion of the unit is identical, in reverse, to the portion designated as "A" and, therefore, includes a bevel gear 46. The inner end of the shaft 41 projects into the bearing 29, substantially as shown in FIG. 4, and the outer end of this shaft is preferably of a reduced diameter and mounts a pulley 48.

Figure 2:
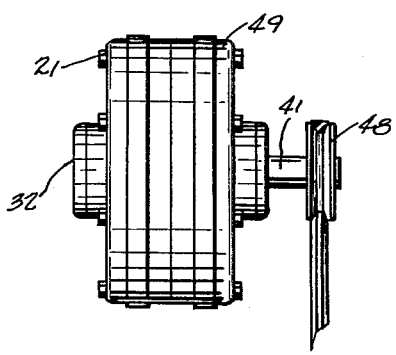
FIG. 2 is an enlarged side elevational view of the reciprocating motion generator embodying the invention.
Figure 3:
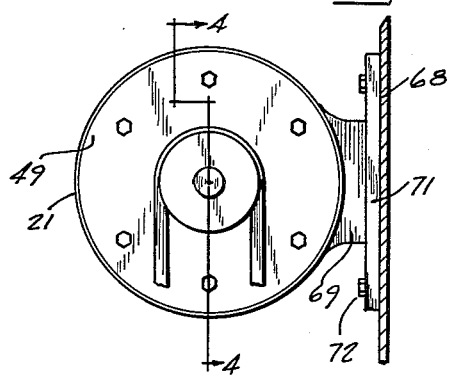
FIG. 3 is an end view of the structure shown in FIG. 2 and suggests one form of mounting a device on a screen or sifting machine.

The keeper plate 22 and parts indicated at "A" and "B"

in FIG. 6 constitute the operative mechanism of the device and, obviously, must be protected by an enclosure that is not only dust and dirt proof, but capable of appropriate attachment to a mechanism requiring reciprocating vibratory motion. To this end, attention is directed to FIGS. 2 and 3, and in particular to FIG. 4. This enclosure takes the form of a two-part housing 49 that, for clarity, may be designated as covers 51 and 52. Cover 51 is cup-shaped and includes a circular side wall 53, the rim or edge of which is offset at 54 to mate with the periphery of the keeper plate 22. The base wall 56 of this cover is preferably perpendicular to the side wall, and includes a laterally directed, hollow hub 57 that is on axis with shaft 32. Projecting into this hub from the interior of the cover is a sleeve bearing 58, the rim 59 of which bears against the base wall 56. A cap plate 61, having an inset oil seal 62, closes the end of the hub 57. Cover 52 is identical with cover 51 and, when in reverse relationship, these covers overlap the periphery of the keeper plate to form the tight, sealed enclosure mentioned above.

As suggested in FIG. 4, each of the covers is provided with inwardly directed ribs 63. When the covers are assembled these ribs are aligned, as well as the openings 64 therein. A bolt 66 projects through these openings and, by means of a nut 67, securely joins the covers together. Of course, each bolt 66 projects through one of the openings 31 in the keeper plate 22, and in this manner the keeper plate and covers are rigidly joined together. Although only suggested in FIG. 3 of the drawings, it is obvious that suitable straps may surround the assembled covers and terminate in brackets which are attachable, for example, to the upright end wall 68 of the box 14 shown in FIGS. 1 and 3. On the other hand, it is conceivable that, since the covers may be of the nature of castings, duplicate, radial offsets 69 may be provided, which terminate in matching plates 71, and these plates may be secured to the box wall 68 in any suitable manner, as by screws 72.

It will be apparent from the structure shown in FIGS. 4 and 6 that assembly of the device is a relatively simple procedure. For instance, the keeper plate 22 shown in FIG. 6, when fitted with gears 28 and bearing 29, is a completely assembled part of the structure. Also, the associated parts, indicated at "A" and "B," are separately assembled. In fact, it will be noted that these parts are neither right or left-hand except for the fact that shaft 41, at its end, is of reduced diameter and sized to receive the pulley 48. The covers 51 and 52 are individually assembled by inserting the sealing bearing 58 and applying the cap plate 61. Once these parts have been assembled with each cover, it is a simple matter to mount the operative parts, indicated at "A" in FIG. 6, by merely projecting the outboard end of shaft 32 into and through the bearing 58 and cap 61. The collar 43 (not shown), when in abutment with the bearing rim 59, determines the location of the weight 34 within the cover 51. Following this, the bearing 29 of the keeper plate 22 is engaged with the inboard end 33 of shaft 32. It will also be noted that the periphery of this plate engages the offset 54 of the rim of the cover 51. Next, the parts indicated at "B," and including the weight 44, are assembled with the cover 52. Following this, these combined parts and cover are engaged with the keeper plate 22 and cover 51, the various bevel gears, of course, having been positioned to properly mesh. Bolts 66 may now be projected through the openings 64 in the covers and, when nuts 67 are tightened, all of the parts are secured within the enclosure and the device presents an appearance substantially that shown in FIG. 2. Of course, suitable lubricant is admitted to the device prior to complete assembly and, since the covers and the outboard bearings are leak-proof, it is evident that the lubricant cannot escape, nor can any dirt enter the device at any time. The provision of a sealed unit of this nature is of extreme importance when it is considered that the device is intended for use in the handling of aggregate material which inevitably includes a considerable amount of dust that could render the device ineffective if the operative parts were not sealed in an enclosure.

It is pointed out that the present invention has been designed and produced with a view to eliminating any offset housing or other parts, and the various operative parts, such as gears, bearings, etc., being of standard design, pose no problem to manufacture or replacement and, obviously, tend to reduce the manufacturing costs. It is also pointed out that, since the weights rotate about the same axis, undesirable yaw is completely eliminated and the device therefore produces only the desired reciprocating motion, the extent of which is governed by the speed of rotation of the driven shaft 41.

Although only one form of the invention has been shown and described, it will be evident that variations may be made, such, for example, as increasing or decreasing the size of the parts to enable use of the device under various conditions, and such variations are considered as being within the spirit and scope of the invention insofar as they are set out in the annexed claims.

Having thus set forth my invention, what I claim as new and for which I desire protection by Letters Patent is:

1. A reciprocating motion generator of the character described for imparting oscillatory motion to apparatus along a substantially single plane comprising a circular plate located between a pair of covers, said covers being fitted and secured to the peripheral faces of said plate and forming an enclosure therewith, a pair of co-axial rotatable shafts having end bearing support in said plate and said covers, one of said shafts being rotated by suitable external drive means, two weights in said enclosure, one being mounted on and rotatable with each of said shafts, cooperative means on said plate and said shafts for rotating said weights in opposite directions when said one shaft is rotated by said drive means.

2. A reciprocating motion generator of the character described for imparting oscillatory motion to attached apparatus along a substantially single plane comprising a circular disk-like plate, a pair of co-axial rotatable shafts having inboard bearing support in said plate, a pair of weights mounted one on each of said shafts and spaced by said plate, one of said shafts being rotatable by suitable external drive means, cooperative means on said plate and said shafts for rotating said weights in opposite directions when said one shaft is rotated by said drive means, and an enclosure for all of the structure, said enclosure providing outboard bearing support for said shafts.

3. A reciprocating motion generator of the character described for imparting oscillatory motion to apparatus along a substantially single plane comprising a circular plate located between a pair of covers, said covers being fitted and secured to the peripheral faces of said plate and forming an enclosure therewith, a set of uniformly spaced bevel gears carried by said plate and rotatable about axes radial to the axis of said plate, two weights in said enclosure located one adjacent each face of said plate, a bevel gear on each of said weights engaged with the bevel gears on said plate, co-axial shafts mounting said weights, said shafts being supported at their inboard ends in said plates and at their outboard ends in said covers, one of said shafts being power driven and serving through all of said bevel gears to rotate the other of said shafts oppositely to said driven shaft.

4. A reciprocating motion generator of the character described for imparting oscillatory motion to apparatus along a substantially single plane comprising a circular disk-like plate located between a pair of identical cup shaped covers, said covers being interfitted with and secured to the peripheral faces of said plate and forming therewith two interior compartments, a set of uniformly spaced bevel gears carried by said plate and rotatable about axes radial to the axis of said plate, a weight in each of said compartments, co-axial shafts having centered inboard support in a bearing centered in said plate, said shafts mounting the weights in said compartments, a bevel gear on each weight engaged with the bevel gears on said plate, sealed bearings in the hub portion of said covers for mounting the outboard ends of said shafts, one of said shafts being power driven and serving through all of said bevel gears to rotate the other of said shafts oppositely to said driven shaft.

5. A reciprocating motion generator as set forth in claim 1, wherein the operative parts associated with the circular plate are of duplicate construction.

6. A reciprocating motion generator as set forth in claim 1, wherein the weights are of equal value and in one complete cycle of operation alternately combine and oppose their forces to create said motion.

7. A reciprocating motion generator of the character described for imparting oscillatory motion to apparatus along a substantially single plate comprising a circular disk-like plate located between a pair of identical cup shaped covers, said covers being interfitted with and secured to the peripheral faces of said plate and forming therewith two interior compartments, a set of gears carried by said plate and projecting to an equal extent into said compartments, a weight in each of said compartments, co-axial shafts having centered inboard support in said plate, said shafts mounting the weights in said compartments, a gear on each weight engaged with the gears on said plate, sealed bearings in the hub portion of said covers for mounting the outboard ends of said shafts, one of said shafts being power driven and serving through all of said gears to rotate the other of said shafts oppositely to said driven shaft.

References Cited by the Examiner
UNITED STATES PATENTS

| | | | |
|---|---|---|---|
| 1,193,709 | 8/16 | Mennie | 74—713 |
| 1,409,389 | 3/22 | Mills | 74—713 |
| 1,827,586 | 10/31 | Keefer | 74—713 |
| 1,999,213 | 4/35 | Shaler | 74—606 |
| 2,189,912 | 2/40 | Lang | 74—606 |
| 2,248,182 | 7/41 | Mateer | 74—61 |
| 2,892,353 | 6/59 | Harshberger | 74—61 |

FOREIGN PATENTS 756,723  3/34  France.

BROUGHTON G. DURHAM, *Primary Examiner.*